(12) United States Patent
Passmore et al.

(10) Patent No.: US 11,354,924 B1
(45) Date of Patent: Jun. 7, 2022

(54) HAND RECOGNITION SYSTEM THAT COMPARES NARROW BAND ULTRAVIOLET-ABSORBING SKIN CHROMOPHORES

(71) Applicant: VR Media Technology, Inc., Los Angeles, CA (US)

(72) Inventors: Charles Gregory Passmore, Austin, TX (US); Sabine Bredow, Austin, TX (US)

(73) Assignee: VR Media Technology, Inc., Los Angeles, CA (US)

( * ) Notice: Subject to any disclaimer, the term of this patent is extended or adjusted under 35 U.S.C. 154(b) by 0 days.

(21) Appl. No.: 17/584,311

(22) Filed: Jan. 25, 2022

Related U.S. Application Data

(63) Continuation-in-part of application No. 17/322,818, filed on May 17, 2021, now Pat. No. 11,232,283.

(51) Int. Cl.
*G06V 40/10* (2022.01)
*G06T 7/33* (2017.01)
(Continued)

(52) U.S. Cl.
CPC .............. *G06V 40/11* (2022.01); *G06T 7/33* (2017.01); *G06V 10/225* (2022.01); *G06V 10/82* (2022.01);
(Continued)

(58) Field of Classification Search
CPC ...... G06V 40/11; G06V 10/225; G06V 10/82; G06V 40/117; G06T 7/33;
(Continued)

(56) References Cited

U.S. PATENT DOCUMENTS

| 6,647,157 B1 | 11/2003 | Shiiyama et al. |
| 8,824,828 B1 | 9/2014 | Winn |

(Continued)

FOREIGN PATENT DOCUMENTS

| CN | 101571911 | 11/2009 |
| CN | 113574537 | * 2/2020 |

(Continued)

OTHER PUBLICATIONS

Machine translation for CN 113574537 (Year: 2020).*
(Continued)

*Primary Examiner* — Qian Yang
(74) *Attorney, Agent, or Firm* — Arc IP Law, PC; Joseph J. Mayo

(57) ABSTRACT

Hand recognition system that compares narrow band ultraviolet-absorbing skin chromophores to identify a subject. Ultraviolet images of hands show much greater detail than visible light images, so matching of ultraviolet images may be much more accurate. A database of known persons may contain reference ultraviolet hand images tagged with each person's identity. Reference images and subject images may be processed to locate the hands, identify features (such as chromophores), compare and match feature descriptors, and calculate correlation scores between the subject image and each reference image. Locating and normalizing hand images may use infrared and visible light cameras in addition to ultraviolet. If the subject is moving, the subject's hand may be tracked, a 3D model of the subject's hand may be developed from multiple images, and this model may be rotated so that the orientation matches that of the reference images.

18 Claims, 16 Drawing Sheets
(9 of 16 Drawing Sheet(s) Filed in Color)

(51) Int. Cl.
*G06V 10/22* (2022.01)
*G06V 10/82* (2022.01)
*H04N 5/247* (2006.01)

(52) U.S. Cl.
CPC ........... *G06V 40/117* (2022.01); *H04N 5/247* (2013.01); *G06T 2207/10048* (2013.01); *G06T 2207/20084* (2013.01); *G06T 2207/30196* (2013.01)

(58) Field of Classification Search
CPC . G06T 2207/10048; G06T 2207/20084; G06T 2207/30196; H04N 5/247
See application file for complete search history.

(56) References Cited

U.S. PATENT DOCUMENTS

| | | |
|---|---|---|
| 9,892,324 B1 | 2/2018 | Pachauri |
| 2009/0175509 A1 | 7/2009 | Gonion et al. |
| 2009/0185185 A1 | 7/2009 | Shakespeare et al. |
| 2014/0125809 A1 | 5/2014 | Thorsted |
| 2015/0054823 A1 | 2/2015 | Dzhurinskiy et al. |
| 2015/0269406 A1 | 9/2015 | Hama et al. |
| 2016/0284123 A1 | 9/2016 | Hare et al. |
| 2017/0300685 A1 | 10/2017 | Teichman |
| 2018/0060683 A1* | 3/2018 | Kontsevich ......... H04L 63/0861 |
| 2018/0343501 A1 | 11/2018 | Yu |
| 2020/0311404 A1* | 10/2020 | Derakhshani .......... G06N 20/00 |
| 2021/0295010 A1* | 9/2021 | Ross .................... G06V 10/145 |

FOREIGN PATENT DOCUMENTS

| | | | |
|---|---|---|---|
| JP | 2022-21537 | * | 7/2020 |
| KR | 101995466 | | 7/2019 |

OTHER PUBLICATIONS

Machine translation for JP 2022-21537 (Year: 2020).*
Kong et al., "Multiscale Fusion of Visible and Thermal IR Images for Illumination-Invariant Face Recognition", International Journal of Computer Vision 71(2), 215-233, 2007 (Year: 2007).*
Siegmund et al., Face Presentation Attack Detection in Ultraviolet Spectrum via Local and Global Features, 2020 International Conference of the Biometrics Special Interest Group (Year: 2020).*
Lu, et al., "Matching 2.5D Face Scans to 3D Models", IEEE Transactions on Pattern Analysis and Machine Intelligence, vol. 28, No. 1, Jan. 2006.

* cited by examiner

FIG. 4
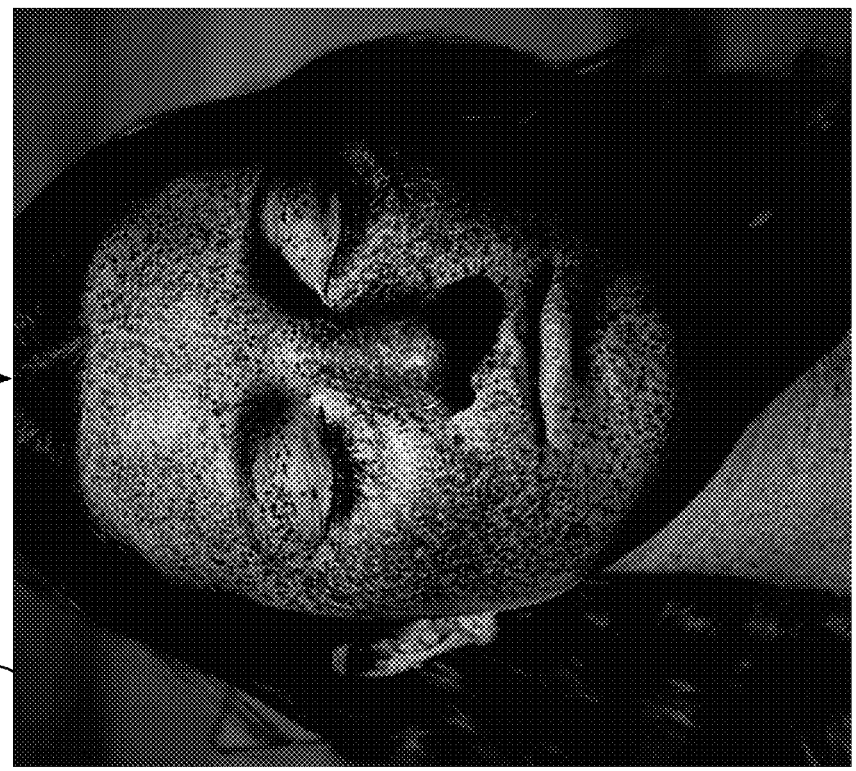
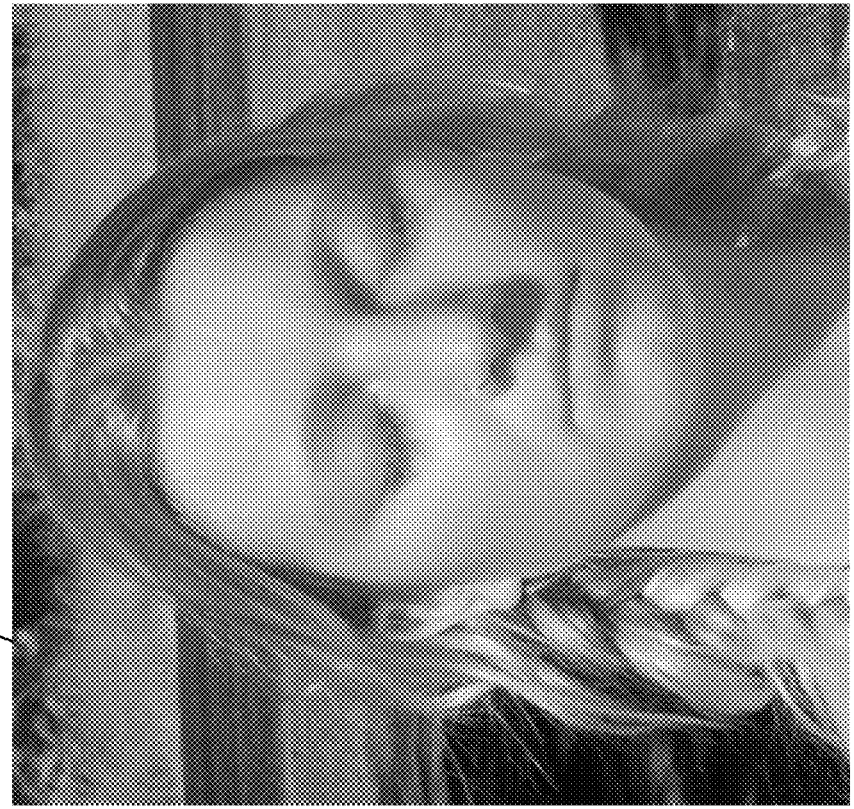

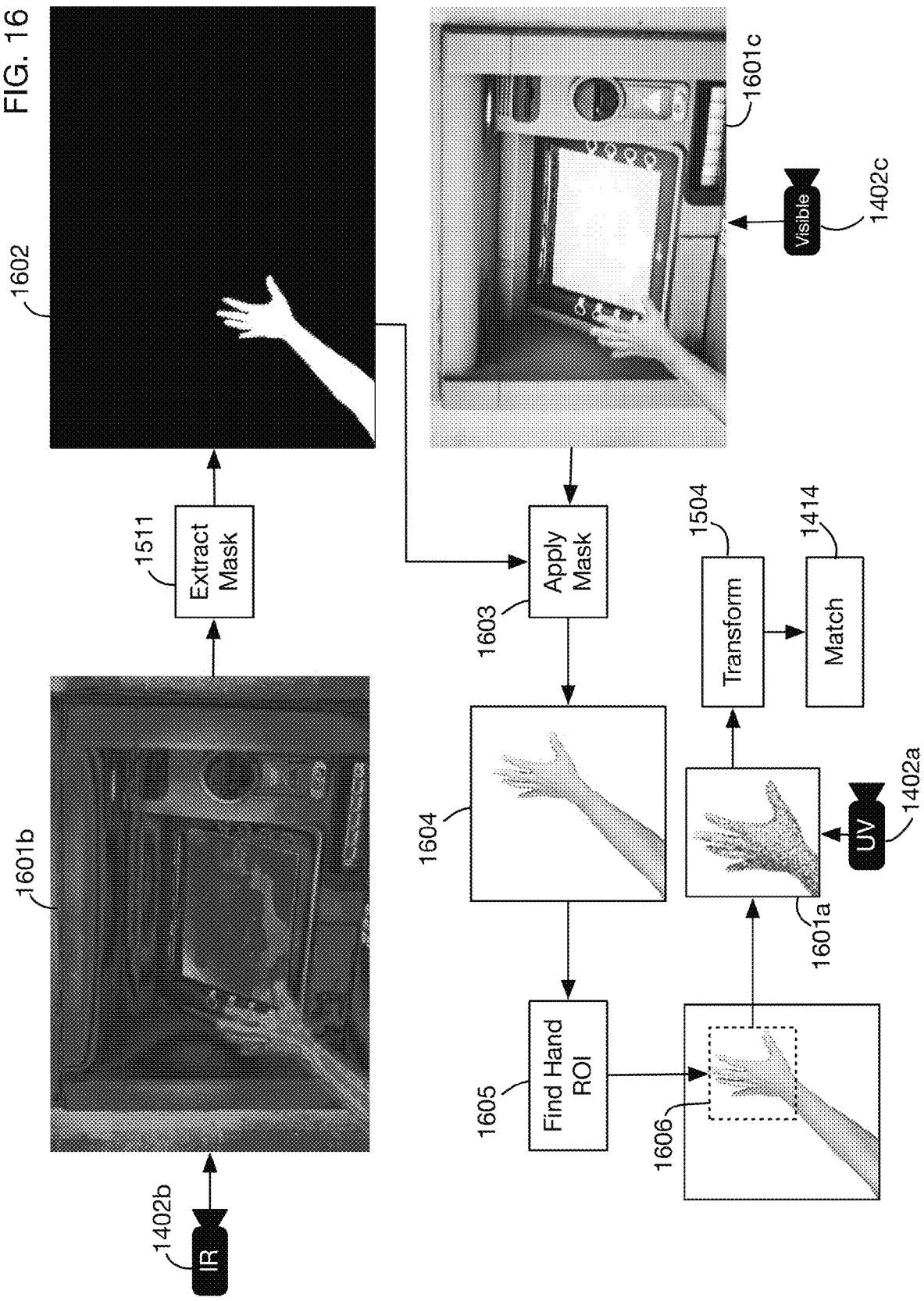

HAND RECOGNITION SYSTEM THAT COMPARES NARROW BAND ULTRAVIOLET-ABSORBING SKIN CHROMOPHORES

This application is a continuation-in-part of U.S. Utility patent application Ser. No. 17/322,818, filed 17 May 2021, the specification of which is hereby incorporated herein by reference.

BACKGROUND OF THE INVENTION

Field of the Invention

One or more embodiments of the invention are related to the field of image processing. More particularly, but not by way of limitation, one or more embodiments of the invention enable a hand recognition system that compares narrow band ultraviolet-absorbing skin chromophores.

Description of the Related Art

Facial recognition systems are commonly used to identify a person by matching an image of the person's face to a database of face images. Existing systems do not have high accuracy, particularly when images are captured in uncontrolled environments or when the person to be identified is moving around or is in a crowd.

One of the reasons for the limited accuracy of existing systems is that images of faces do not provide a large number of distinctive features to match upon. The inventor has discovered that many more facial features are visible in the ultraviolet band, because many facial chromophores appear only in this band. Using ultraviolet images for facial recognition can therefore greatly increase accuracy and extend the situations in which facial recognition can be used.

Visual recognition of other parts of a person's body may also be valuable for certain applications, either alone or in combination with facial recognition. For example, hand recognition may be useful for entry control systems or for applications where a hand is naturally extended, such as transactions at an ATM. Hand recognition technologies known in the art are generally based on palm prints or fingerprints. Existing systems do not have high accuracy, particularly when images are captured in uncontrolled environments or when the person to be identified is moving around or is in a crowd.

One of the reasons for the limited accuracy of existing systems is that images of hands, especially commonly seen portions of hands, such as the back of a hand, do not provide a large number of distinctive features to match upon. The inventor has discovered that many more hand features are visible in the ultraviolet band, because many hand chromophores appear only in this band. Using ultraviolet images for hand recognition can therefore greatly increase accuracy and extend the situations in which hand recognition can be used. Chromophores on the hand, particularly on the back of the hand, provide a distinctive signature of a person's identity that can be used for recognition and identification.

For at least the limitations described above there is a need for a hand recognition system that compares narrow band ultraviolet-absorbing skin chromophores.

BRIEF SUMMARY OF THE INVENTION

One or more embodiments described in the specification are related to a hand recognition system that compares narrow band ultraviolet-absorbing skin chromophores. Embodiments of the invention may identify an unknown subject by comparing an ultraviolet image of the subject's hand to a database of known persons with corresponding ultraviolet hand images.

One or more embodiments of the invention include an ultraviolet spectrum image capture element with a filter that selects wavelengths in an ultraviolet band and an ultraviolet camera that is sensitive to at least this ultraviolet band. They may also have an infrared camera that captures infrared wavelengths, and a visible light camera that captures visible light wavelengths. These embodiments may also have a database of person hand images captured in the ultraviolet band, where each image is associated with a person. They may also have one or more processors coupled to the image capture elements and to the database. The processor(s) may process the database images by identifying features in each person's ultraviolet hand image, and calculating descriptors of these features. The processor(s) may obtain images of a subject, locate the subject's hand in the ultraviolet image, identify features in the subject's ultraviolet hand image, and calculate descriptors of those features. The processor(s) may then compare feature descriptors of the subject ultraviolet hand image to those of each person's ultraviolet hand image to calculate a correlation score for each person ultraviolet hand image in the database, and then select a matching person ultraviolet hand image with the highest correlation score, when that score is also greater than a threshold value. The subject may then be identified as the person associated with the matching person ultraviolet hand image. In one or more embodiments, the anchors/corners and correlation may be implemented with a Fourier transform to compare spectrograms, e.g., of the subject and person. In one or more embodiments, the Fourier domain may be much faster and lend itself to optical computing to eliminate computers entirely from the imaging and comparison process. Such embodiment would not require a sensor, but use filters and a lens, capture the focal point to obtain the frequency spectrum, mask with a vibrating imaging light valve (OLED or CD panel) and measure the overall light passing through with an optical integrator. This embodiment can perform extremely rapid comparisons and bypass the sensor scanout for example.

Locating the hand image may be performed in one or more embodiments by obtaining a mask from the infrared image of the subject that contains the subject's hand, applying this mask to the visible light image of the subject to obtain a masked visible image, and inputting the masked visible image into a hand detection element, such as a neural network that may detect and localize a hand in an image. A YOLO neural network may be used in one or more embodiments for example. The bounding box of the hand may be applied to the ultraviolet image to extract the ultraviolet hand image of the subject for matching against the database.

In one or more embodiments of the invention, the hand recognition may recognize the back of the subject's hand. The ultraviolet image of the subject may include the back of the subject's hand, and the ultraviolet images of persons in the database may include images of the back of each person's hand.

In one or more embodiments, the wavelengths in the ultraviolet band may include 365 nanometers. The bandwidth of this band may be less than or equal to 25 nanometers. In one or more embodiments the ultraviolet band may for example include a range of 360 to 370 nanometers.

In one or more embodiments, the ultraviolet image capture element may have a lens that is made of or contains one or more of quartz, fused silica, sapphire, magnesium fluoride, calcium fluoride or thin low count glass elements or pancake lenses.

One or more embodiments may identify features in the subject hand image and the person hand images in the database using a corner detector, such as any selected from the Moravec family of corner detectors, e.g., a Harris-Stephens, Kanade-Lucas-Tomasi, Shi-Tomasi, Förstner corner detector or similar algorithm. Feature descriptors may be for example SURF descriptors.

In one or more embodiments, calculation of a correlation score between a person hand image and a subject hand image may include calculating matching feature pairs between the two images, where features match if their feature descriptors match. The correlation score may be for example the count of the number of matching feature pairs. Another correlation score that may be used in one or more embodiments is a measure of the similarity of the slopes of line segments connecting the features of matching pairs.

In one or more embodiments, the processor(s) may enhance the contrast of the person hand images and the subject hand image, using for example a local S-curve transformation.

In one or more embodiments, the processor(s) may transform the person hand images and the subject hand image to a standard size and aspect ratio.

In one or more embodiments, the processor(s) may obtain a sequence of scene images from the ultraviolet camera over a time period, locate a first hand image in one of the scene images, and locate a corresponding sequence of hand images in the sequence of scene images. The processor(s) may then construct a 3D model of the hand from the sequence of hand images, and rotate this 3D model to the orientation of each person hand image to form the subject image to be compared to the database. Locating the hand image in the sequence of scene images may include identifying anchor points in the first hand image, and locating points in the sequence of scene images that match the anchor points. Anchor point identification and matching may for example use a SIFT algorithm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 4 shows an example of a visible spectrum image of a subject compared to an ultraviolet image of the subject, illustrating the additional detail in the ultraviolet image.

FIG. 16 shows an illustrative example of the hand image extraction steps described in FIG. 15.

DETAILED DESCRIPTION OF THE INVENTION

A hand recognition system that compares narrow band ultraviolet-absorbing skin chromophores will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1B:
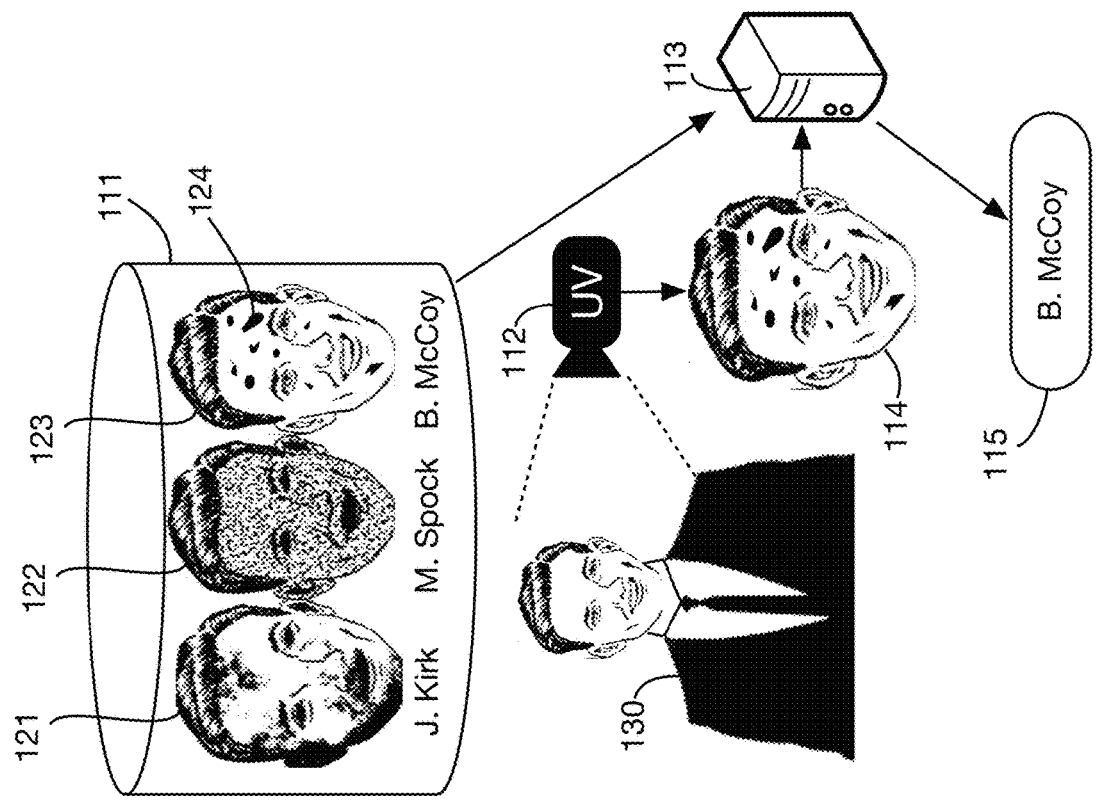
FIG. 1B shows an architecture of an illustrative embodiment of the invention, which compares images captured in the ultraviolet spectrum to achieve more accurate person recognition.
Figure 1A:
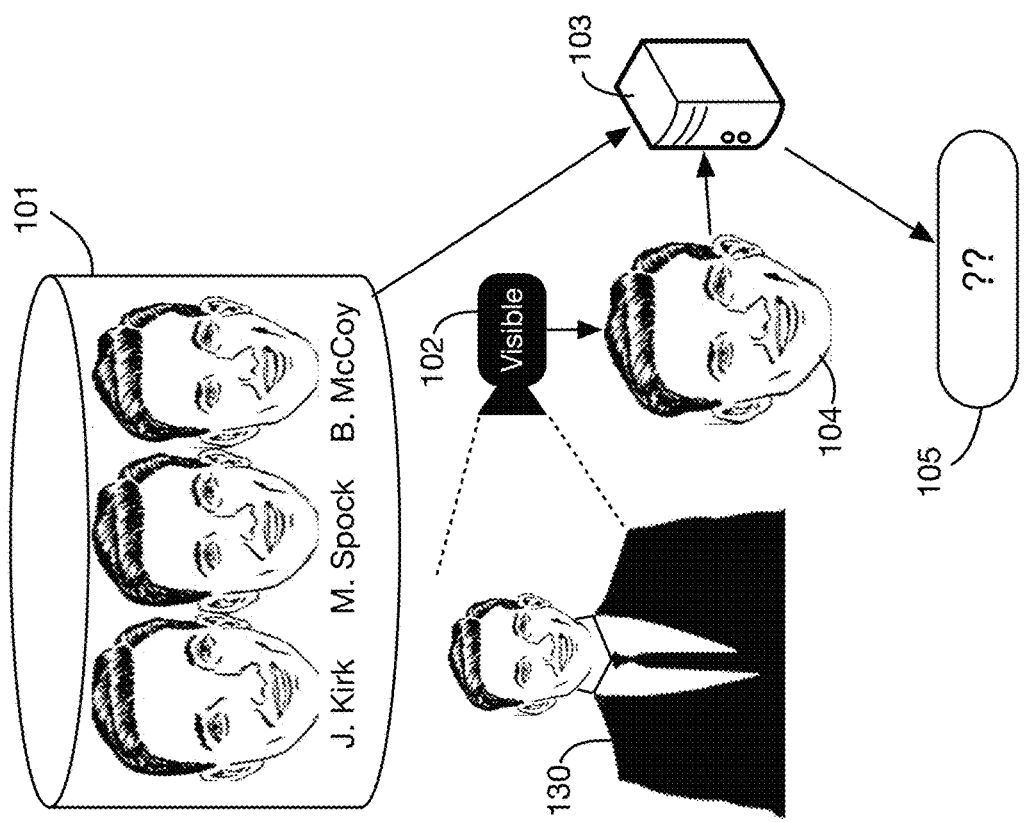
FIG. 1A shows an architecture of a typical facial recognition system known in the art, which compares images captured in the visible spectrum.

FIG. 1A shows elements of a typical facial recognition system known in the art. Such systems may have a database 101 of facial images, each tagged with the identity of the person associated with the face. When an unknown subject 130 arrives, a camera 102 may capture an image 104 of the subject's face, and one or more processors 103 may then compare the image 104 to the images in database 101 to look for a match. The image 104 and the reference images in database 101 are typically captured with a visible light camera (or cameras) 102. In the example shown in FIG. 1A, the visible spectrum images of the three illustrative persons shown in database 101 are very similar; therefore it is difficult for processor 103 to determine which image (if any)

matches the subject image 104. The recognition process may therefore fail and report result 105 indicating that it cannot determine who the subject is, or it may report a best match that may be incorrect or have low confidence. This possibility of ambiguity or low accuracy increases as the number of reference images and identities in database 101 becomes large. For example, in a database with millions of entries, it becomes likely that two or more people will have very similar facial appearance, making recognition difficult or impossible.

FIG. 1B shows illustrative components of one or more embodiments of the invention. The inventor has discovered that using ultraviolet spectrum facial images provides a much more reliable and robust method of recognizing persons from their facial images. Instead of (or in addition to) visible camera(s) 102, one or more embodiments of the invention may use ultraviolet camera(s) 112 to capture images of subject 130 and reference images of persons in a database 111. A benefit of using ultraviolet images is that ultraviolet reveals considerably greater details of facial appearance; chromophores in facial skin that are sensitive to ultraviolet wavelengths may vary significantly across persons, even if they have similar visible-spectrum appearances. In the example shown in FIG. 1B, ultraviolet images 121, 122, and 123 of the three persons that were close in appearance to subject 130 in the visible spectrum reveal significant differences in the ultraviolet spectrum. For example, image 123 has chromophores such as chromophore 124 that do not appear in the other persons. Processor or processors 113 may therefore compare subject ultraviolet image 114 to the ultraviolet images in database 111 to find an unambiguous match 115 without difficulty. In addition to reducing ambiguity, use of ultraviolet images may improve the robustness of facial recognition under conditions such as variable lighting or for subjects that present at different angles or distances, or with partially covered faces; small zones of the face may still provide distinctive features when examined in the ultraviolet spectrum.

Illustrative applications of the ultraviolet facial recognition system shown in FIG. 1B may include for example, without limitation, control of entry into a secure facility, tracking of the location of persons of interest, border control, contactless payment/banking/ATM transactions, investigation of crimes from surveillance video, or screening crowds for suspects or persons of interest.

Figure 2:
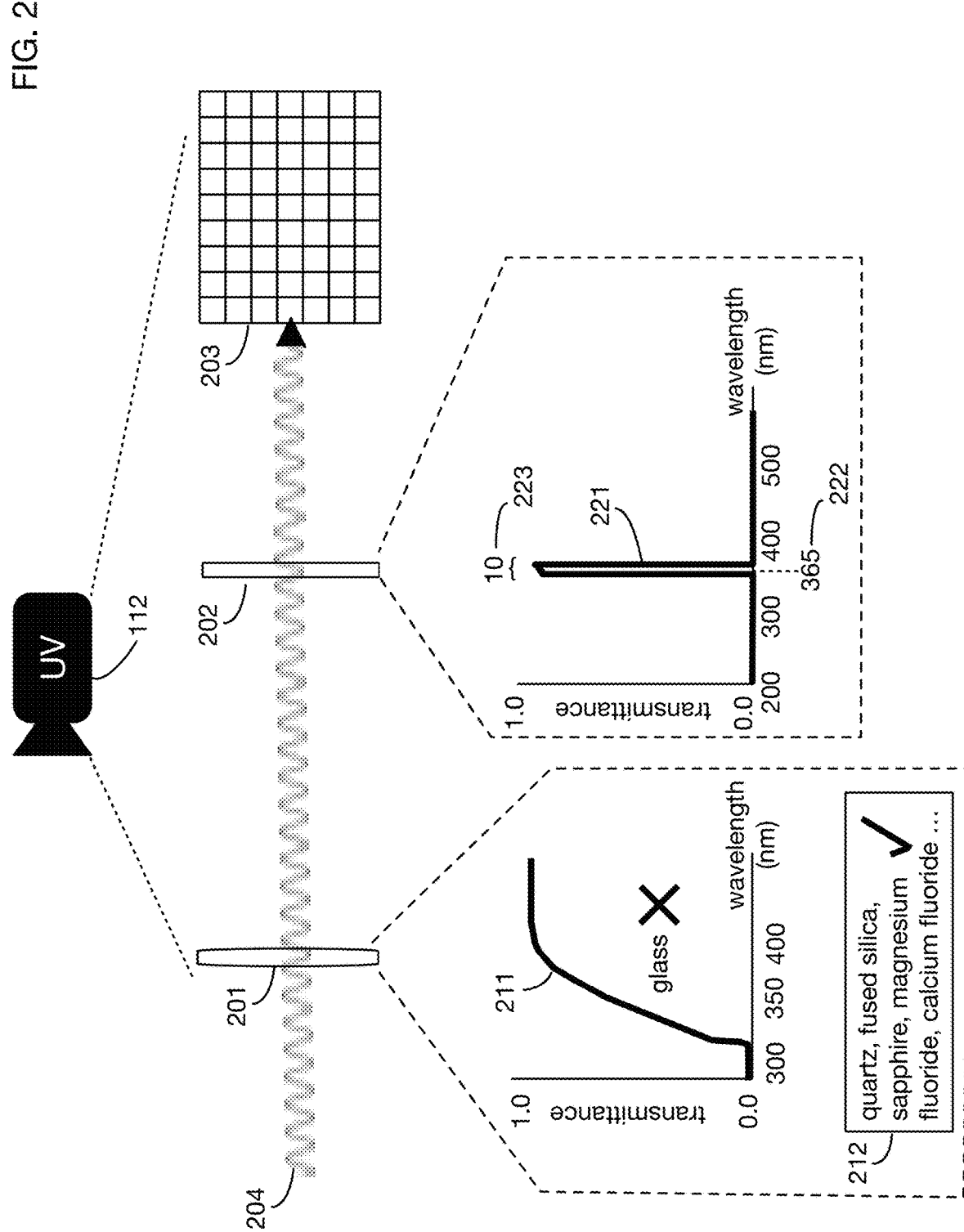
FIG. 2 shows illustrative components of an ultraviolet spectrum imaging system that may be used in one or more embodiments of the invention.

FIG. 2 shows components of an illustrative ultraviolet imaging system 112 that may be used in one or more embodiments of the invention. The imaging system may have for example a lens (or lenses) 201, a filter (or filters) 202, and an image capture element (or elements) 203. (Other components may be present in one or more embodiments, such as lights to illuminate a scene or to provide reference sources for calibration, heating or cooling elements, or components to compensate for temperature or other environmental conditions.) The lens 201 and filter 202 may be designed or selected to pass the desired ultraviolet wavelengths 204 through to the image capture element 203, and to block or attenuate other wavelengths. For ultraviolet imagery, glass lenses are typically inappropriate, since the transmittance 211 of glass is low for ultraviolet frequencies. Therefore in one or more embodiments materials 212 such as quartz, fused silica, sapphire, magnesium fluoride, or calcium fluoride may be used for lens 201. Filter 202 may select a range of wavelengths for image capture element 203, with a response function 221. In one or more embodiments, the desired bandwidth for images may be approximately a band of bandwidth 223 approximately equal to 10 nanometers, centered at wavelength 222 of approximately 365 nanometers. These values are illustrative; one or more embodiments may use different wavelength bands for ultraviolet images. For example, one or more embodiments may use a band of bandwidth 25 nanometers or less. In one or more embodiments, image capture element 203 may be for example a backside illuminated CMOS monochrome imaging sensor without an internal hot-mirror filters, which is sensitive to ultraviolet and infrared light between 200 nanometers and 1000 nanometers.

Figure 3:
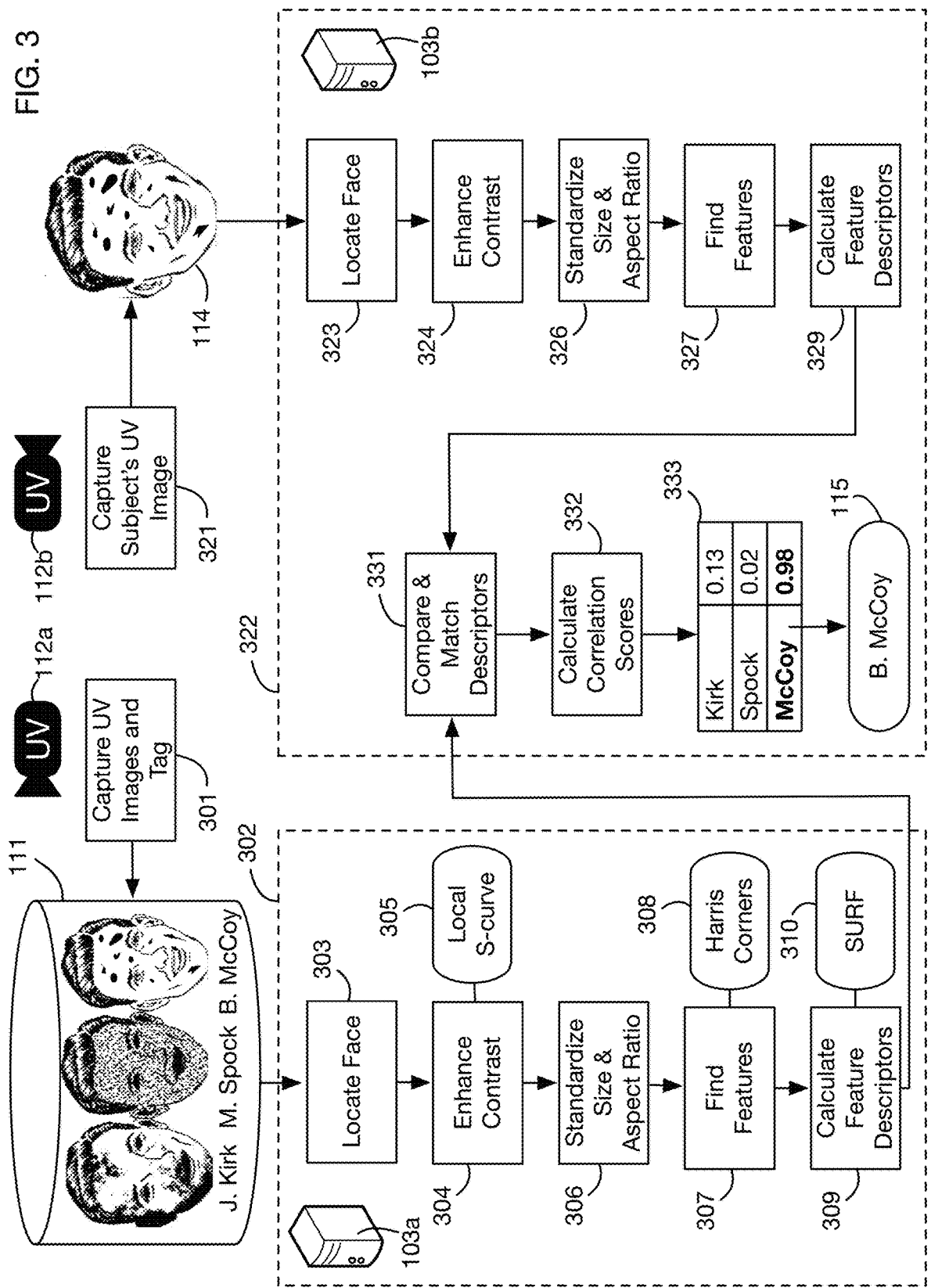
FIG. 3 shows illustrative processing steps to transform and compare ultraviolet images of an unknown subject to a database of ultraviolet images tagged with person identities.

FIG. 3 shows illustrative processing steps that may be used in one or more embodiments to capture, transform, and compare images for facial recognition. Database 111 may be constructed or augmented with step 301 that captures ultraviolet images and tags them with the identity or other information associated with the persons captured. A subject to be identified may have one or more ultraviolet images such as image 114 captured in step 321 using one or more ultraviolet cameras 112b. The camera or cameras 112a that capture the reference images in database 111 may be the same as or different from camera or cameras 112b that image the subject.

Images in database 111 may be processed or transformed using steps 302 to facilitate matching and recognition; this processing may occur when the database images are captured, or any time thereafter. Processed or transformed images, and any derived data, may be stored in database 111 or generated as needed. These steps 302 may be performed by one or more processors 103a. When a subject is to be recognized, processing steps 322 may be performed to process the subject image(s) 114 and to attempt to match the subject against the database 111. These steps 322 may be performed by one or more processors 103b, which may be the same as or different from processor(s) 103a. Processors 103a and 103b may be collocated with or remote from cameras 112a and 112b. Processors may include for example, without limitation, microprocessors, microcontrollers, customized analog or digital circuits, laptop computers, notebook computers, tablet computers, server computers, smartphones, or networks of any of these devices.

In one or more embodiments, the steps contained in 302 and 322 may be performed in any order, or any subsets of these steps may be performed. One or more embodiments may perform additional processing steps on either or both of database images 111 or subject images 114. Steps 302 may be performed on each of the images in database 111, or on selected subsets of these images.

Step 303 may locate a face in an image captured by imaging system 112a. Techniques for finding faces in images are known in the art, and one or more embodiments may use any of these techniques. Outputs of this step 303 may for example include a bounding box around a face area of interest. Step 304 may then enhance the contrast of the facial image. This step may either increase or decrease contrast in an image, either locally or globally. An illustrative method 305 of contrast enhancement that may be used in one or more embodiments is to apply a local S-curve transformation to the image. The inventor has discovered that applying a localized, overlapping, adaptive S-curve transformation often provides better results than applying a single S-curve to an entire image, and that it also often provides better results than histogram equalization or linear stretch convolutional filtering. In one or more embodiments, the S-curves may be selected or modified based on current or expected lighting conditions, which may be measured or estimated based on factors such as time of day and weather.

Step 306 may then transform the facial image to a standard size and aspect ratio. Standardizing the size allows for comparison of images captured at different distances, for example, and standardizing the aspect ratio facilitates feature matching.

Step 307 locates features in the ultraviolet facial image. Any type of feature detection may be used. For example, features may be corners, blobs, or other types of points of interest or areas of interest. In one or more embodiments, features may be detected for example with a corner detector 308 selected from the Moravec family of corner detectors, e.g., a Harris-Stephens, Kanade-Lucas-Tomasi, Shi-Tomasi, Förstner corner detector or similar algorithm. Step 309 then calculates a descriptor for each feature. The descriptor may for example describe the local environment around the feature. An illustrative descriptor 310 that may be used in one or more embodiments is a SURF ("Speeded Up Robust Features") descriptor, which provides a scale-invariant and rotation-invariant descriptor.

Steps 323 through 329 perform similar steps on subject ultraviolet facial image 114 as those described above for steps 302 on database ultraviolet images. The specific techniques and algorithms used for each step 323 through 329 may or may not correspond to those used for steps 303, 304, 306, 307, and 309. However, for ease of implementation and comparison, in one or more embodiments the enhance contrast step 324 may also use local S-curves 305, the find features step 327 may also use corner detector 308 selected from the Moravec family of corner detectors, e.g., a Harris-Stephens, Kanade-Lucas-Tomasi, Shi-Tomasi, Förstner corner detector or similar algorithm, and the calculate feature descriptors step 329 may also use a SURF algorithm.

After features have been located in database images 111 and in subject image 114, and feature descriptors have been calculated, descriptor matching step 331 may be performed to compare the descriptors of features of image 114 to those of each of the database images 111. Feature matching may be performed using any of the image matching algorithms known in the art; for example, a distance measure may be defined in feature space and each feature descriptor in one image may be matched to its nearest neighbor, if the distance to the nearest neighbor is below a threshold value. After matching, step 332 may calculate one or more correlation scores between subject image 114 and each of the images in database 111. Each correlation score describes how closely the subject image matches a database image. Correlation scores may be on any quantitative or qualitative scale, and may be calculated using any algorithm. Illustrative results 333 show the maximum correlation score is for the image associated with person 115. This maximum correlation score may be compared to a threshold correlation value to determine whether the correlation is sufficiently close that the subject should be considered a match to the person with the highest correlation.

Figure 5:
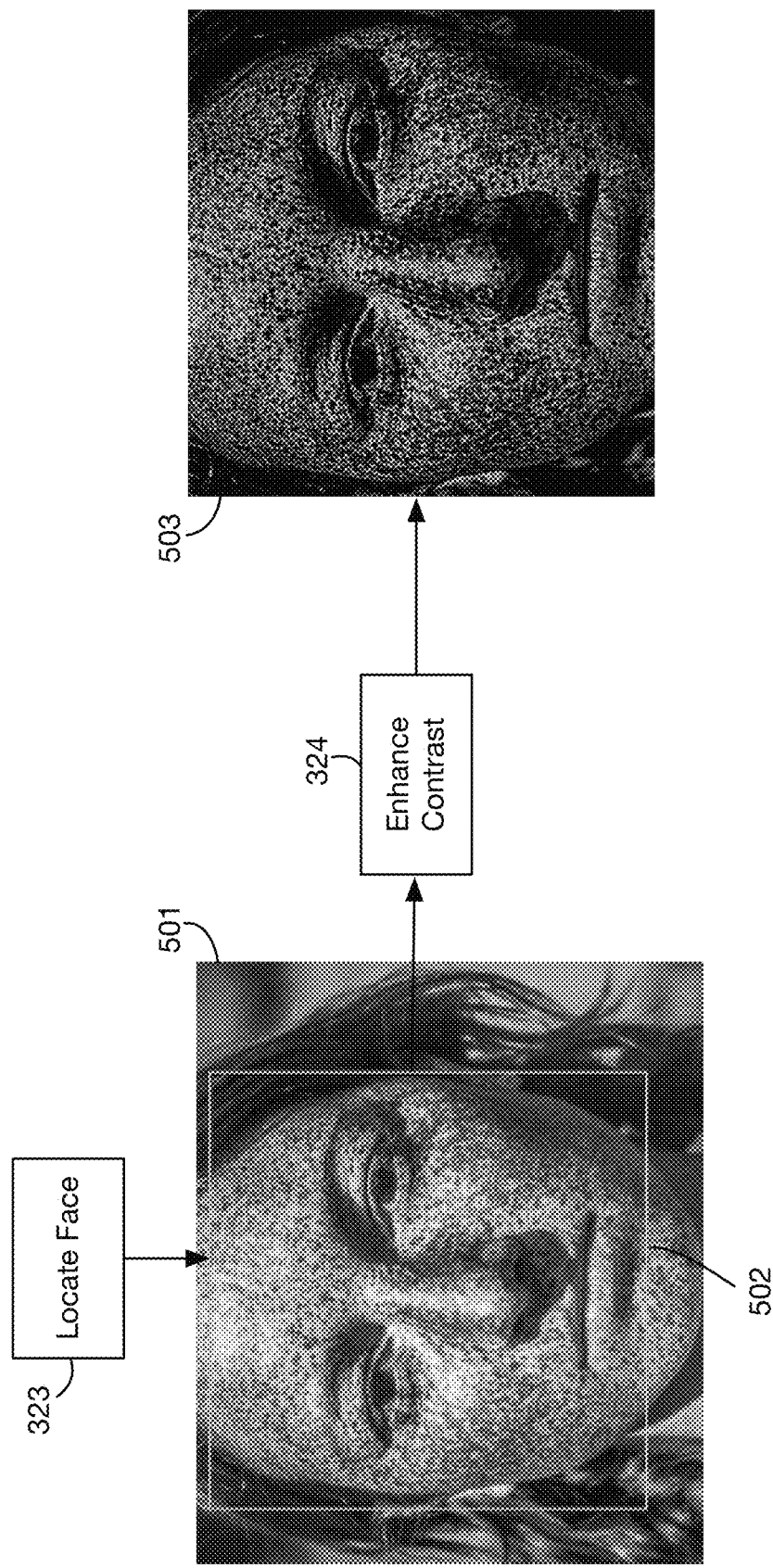
FIG. 5 illustrates two processing steps that may be performed on images: location of a face area of interest in an image, and enhancing the contrast of this area.
Figure 6:
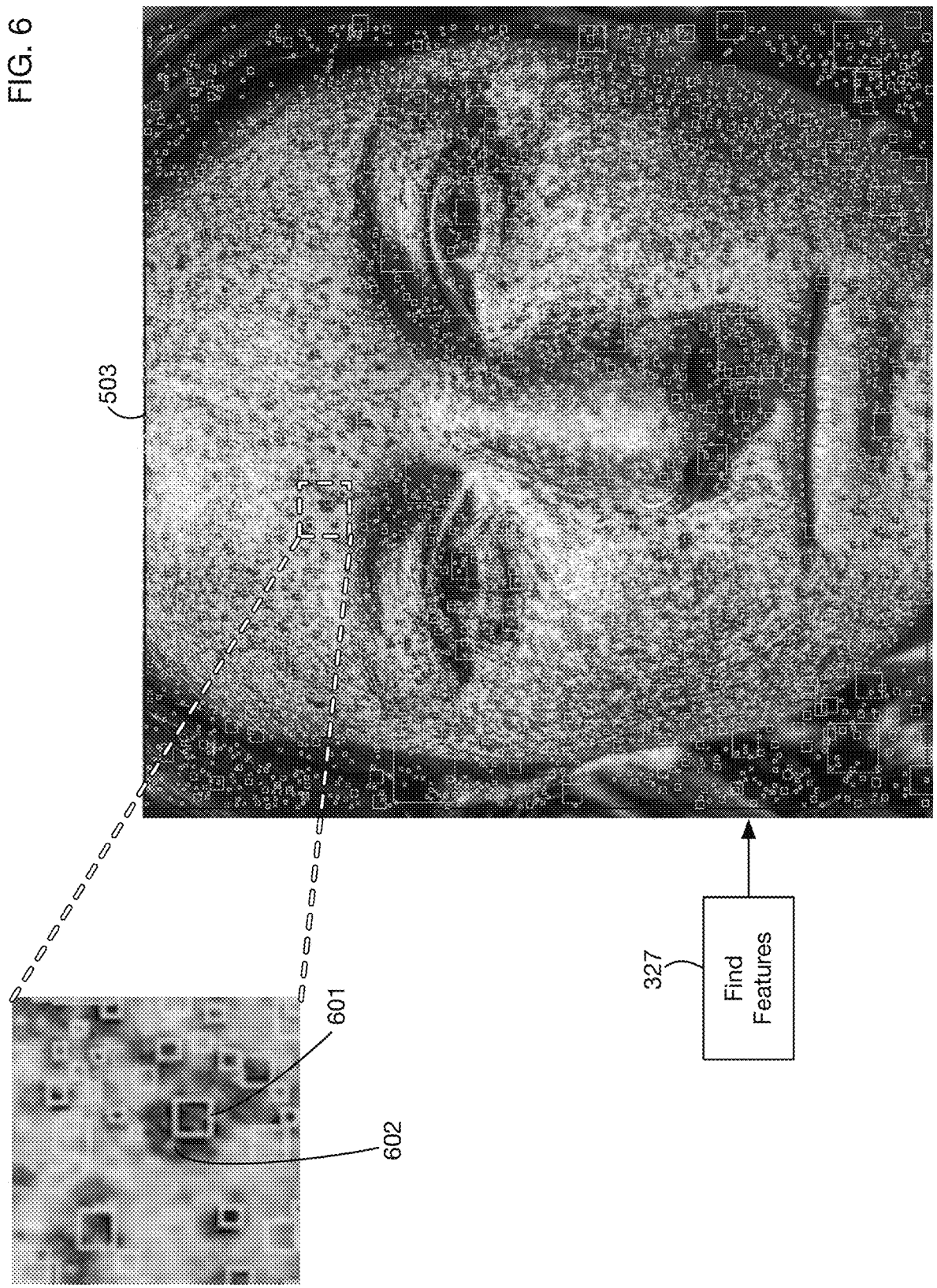
FIG. 6 illustrates location of features in a facial ultraviolet image.

We now illustrate some of the steps shown in FIG. 3 with actual images captured in the ultraviolet spectrum. FIG. 4 shows an illustrative ultraviolet image 402 captured in step 321, and compares it to visible light image 401 of the same subject. The chromophores visible in image 402 provide a much more detailed set of features for matching than the visible light image 401. FIG. 5 shows a facial area of interest 502 located by step 323 in image 501. Locating a facial area of interest may for example use a neural network trained to find faces. Image 503 is the result of contrast enhancement step 324 applied to area of interest 502. FIG. 6 shows results of the feature finding step 327 applied to enhanced facial image 503, showing that many features are located in the ultraviolet face, and many of these features are ultraviolet-sensitive chromophores. For example, feature 601 corresponds to chromophore 602.

Figure 7:
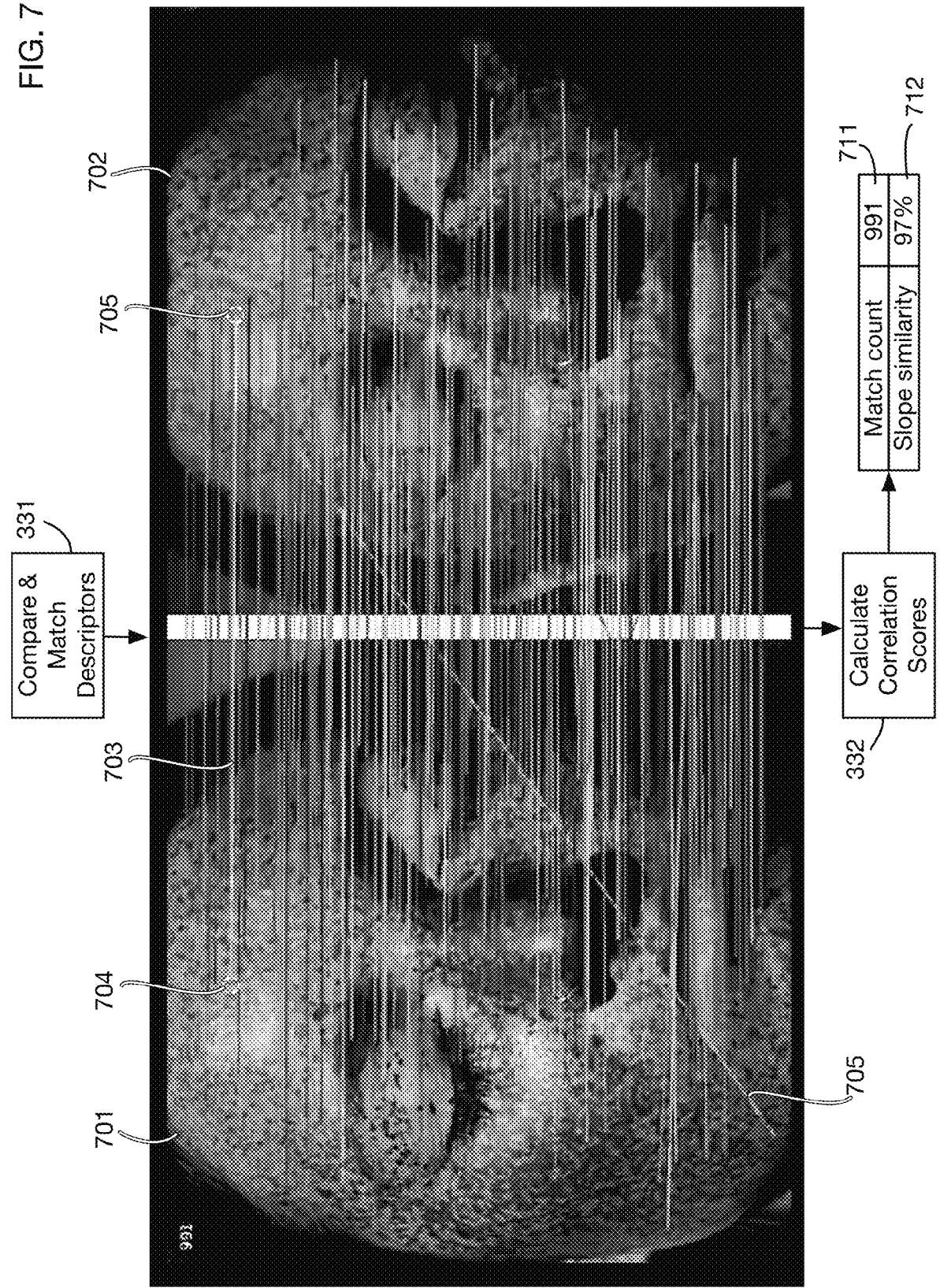
FIG. 7 illustrates matching of two ultraviolet images, here of the same person, by comparing features and calculating correlation scores.

FIG. 7 illustrates comparison step 331 between two ultraviolet images 701 and 702 of the same person. Features have been detected in each face as shown for example in FIG. 6, and descriptors of each feature have been calculated and compared. The line segments connecting the two images are between feature pairs with matching descriptors. (Matching of feature descriptors may use any of the methods known in the art. Matching may be for example based on a distance metric between descriptors that must be below some threshold value for descriptors to match.) Only some of the matching features are shown for ease of illustration. An illustrative match is between feature 704 in image 701 and feature 705 in image 702, with line segment 703 connecting these features. Calculation of correlation scores 332 may for example use the count of the number of matching feature pairs 771, which is high because the two images are of the same person. Another measure of correlation may be for example the parallelism or similarity of the slopes of the lines connecting matching feature points. In FIG. 7, most of the lines, such as line 703, are roughly parallel and therefore have very similar or identical slopes. An exception is line 705, which incorrectly matches two different points in the face, due for example to noise in the image or variations in lighting conditions. The measure of slope similarity 712 also indicates a very close match between the two images.

Figure 8:
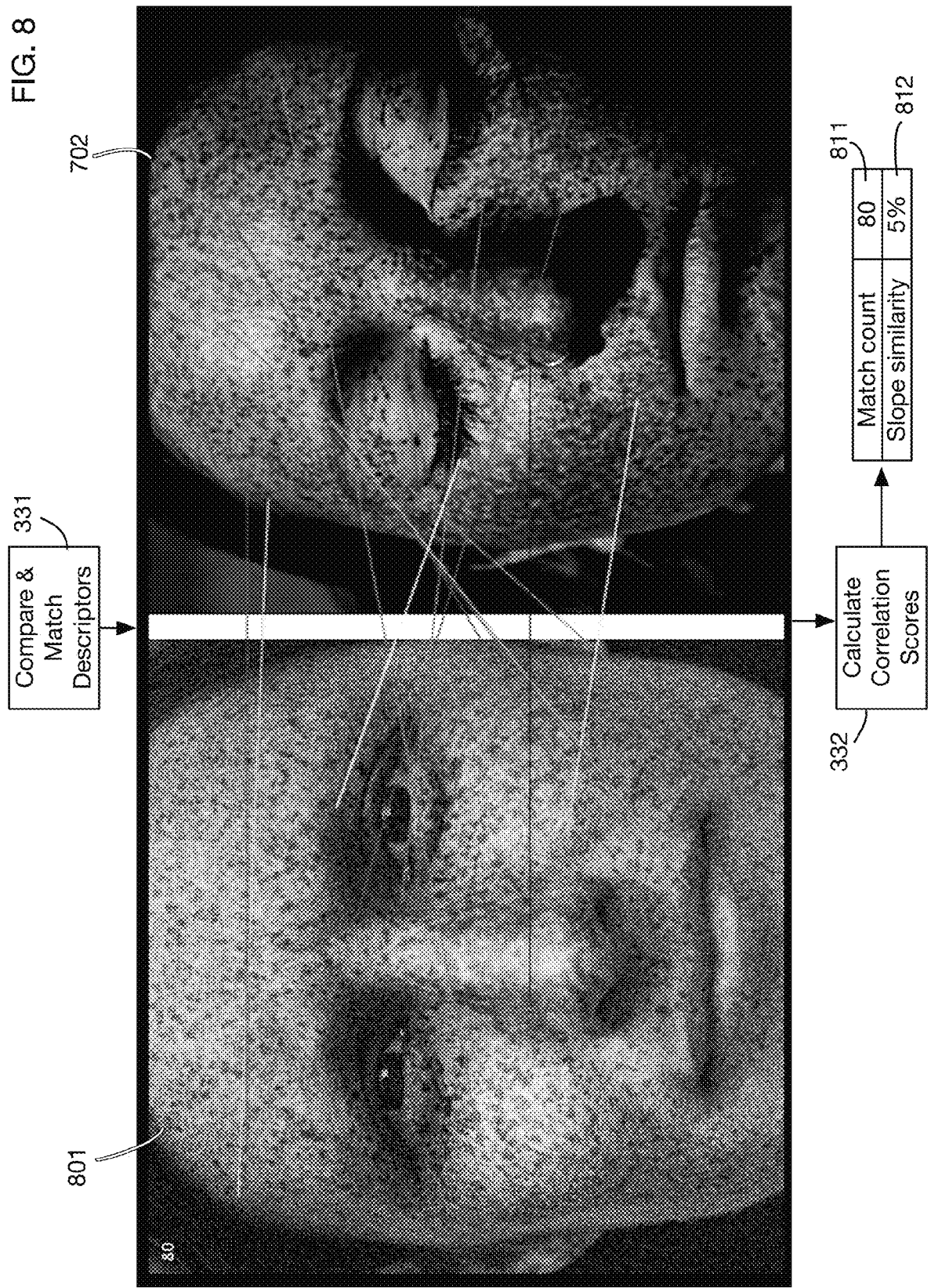
FIG. 8 illustrates comparison of ultraviolet images of different persons.

FIG. 8 shows the results of comparison step 331 between two ultraviolet images 801 and 702 of different people. As in FIG. 7, only some matching feature pairs are shown for ease of illustration. The count 811 of matching feature pairs is much lower than the corresponding count 711 in FIG. 7. Also, the line segments between matching features in FIG. 8 appear to have random slopes, so the measure 812 of slope similarity is low. From these measures it is apparent that image 701 is a much better match for image 702 than is image 801.

Figure 9:
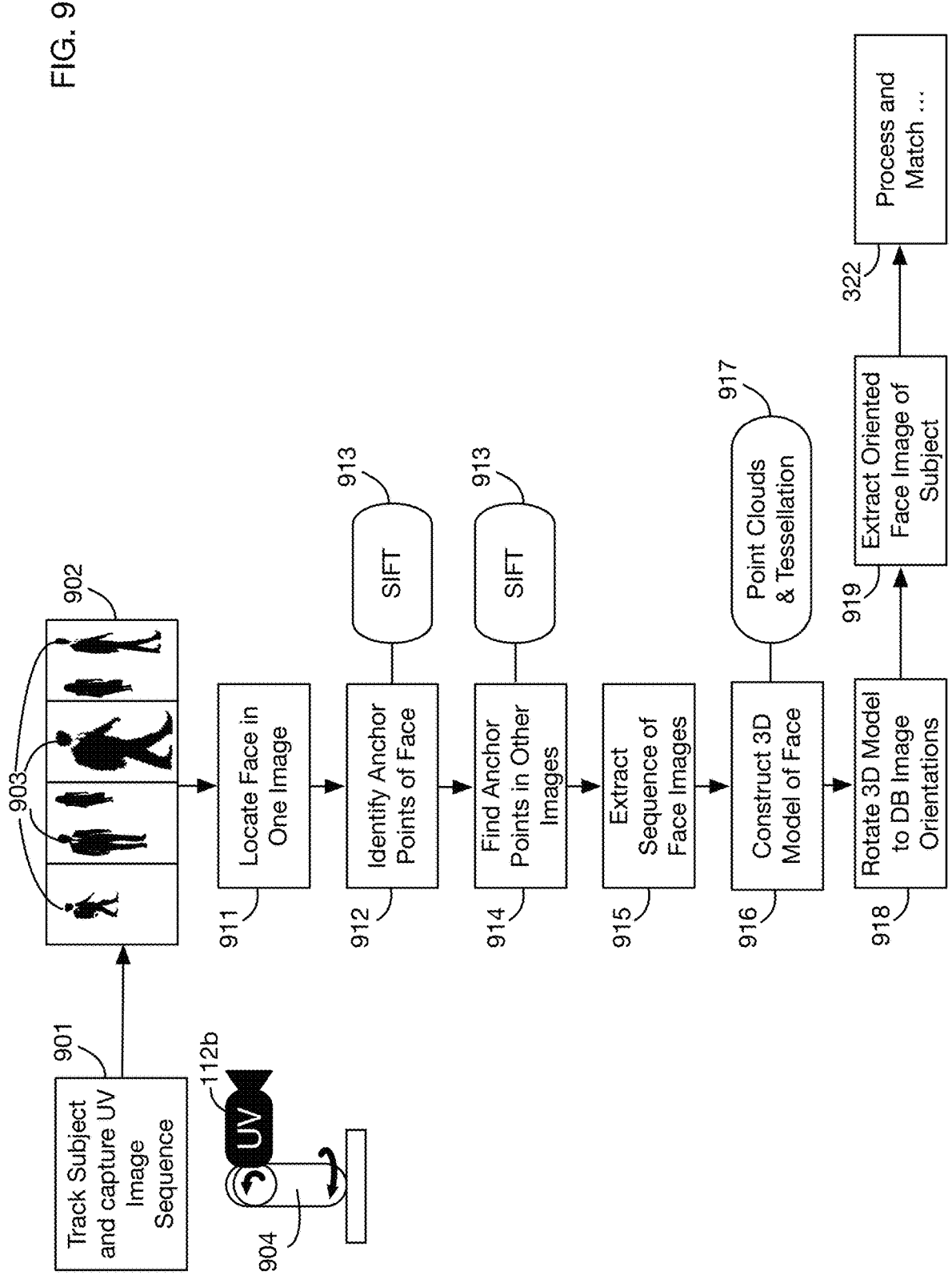
FIG. 9 shows illustrative processing steps that may be performed on a sequence of ultraviolet images of a scene containing the unknown subject.

In some applications of the invention, a subject may appear in front of a camera for identification; this situation may apply for example for entry control. However, in other applications the facial recognition system may for example monitor a crowd of people moving through an area, such as an airport, and may try to identify people in the crowd. This situation may be more challenging because the imaging system may capture subjects at different scales and orientations, and may also have to track a potential subject in a crowd of other people. FIG. 9 shows illustrative steps that may be performed in one or more embodiments to perform facial recognition in this type of situation. These steps may be performed by any processor or processors, including but not limited to the processors 103a and 103b described with respect to FIG. 3. An ultraviolet sensitive imaging system 112b may perform step 901 to capture a sequence of ultraviolet images 902 of a scene, where some or all of these images capture a view of subject 903. In one or more embodiments, the imaging system may include for example a pan-tilt system 904 to track a subject as he or she moves through an area. Step 911 may then locate a face of a subject in one of the scene images in the sequence, and then step 912 may identify anchor points on the face. In step 914, these anchor points may be located in other scene images of sequence 902, to determine the location of the subject's face in each image. An illustrative method 913 that may be used for anchor point detection and matching is SIFT ("scale invariant feature transform"). Once the subject's face is located in each image, step 915 may extract a sequence of face images from sequence 902. Because the face is visible from multiple distances and angles as the subject moves around, standard photogrammetry methods known in the art may be used to construct a three-dimensional model of the face from the sequence of face images. For example, to perform step 916 to construct this model, face images may be converted in step 917 to point clouds that are then tessellated to form a surface of the face; the images may be texture mapped to the model to form the complete 3D facial model. In step 918, the 3D model of the face may be rotated so that the resulting orientation of the face matches the orientation of the face or faces in the database (which may be roughly level and facing forward, for example). This orientation may be standardized in the database, or it may differ across database entries. The correctly oriented face image may then be extracted in step 919 to form the subject face image, which may then be processed and match using steps 922 as described above.

Figure 10:
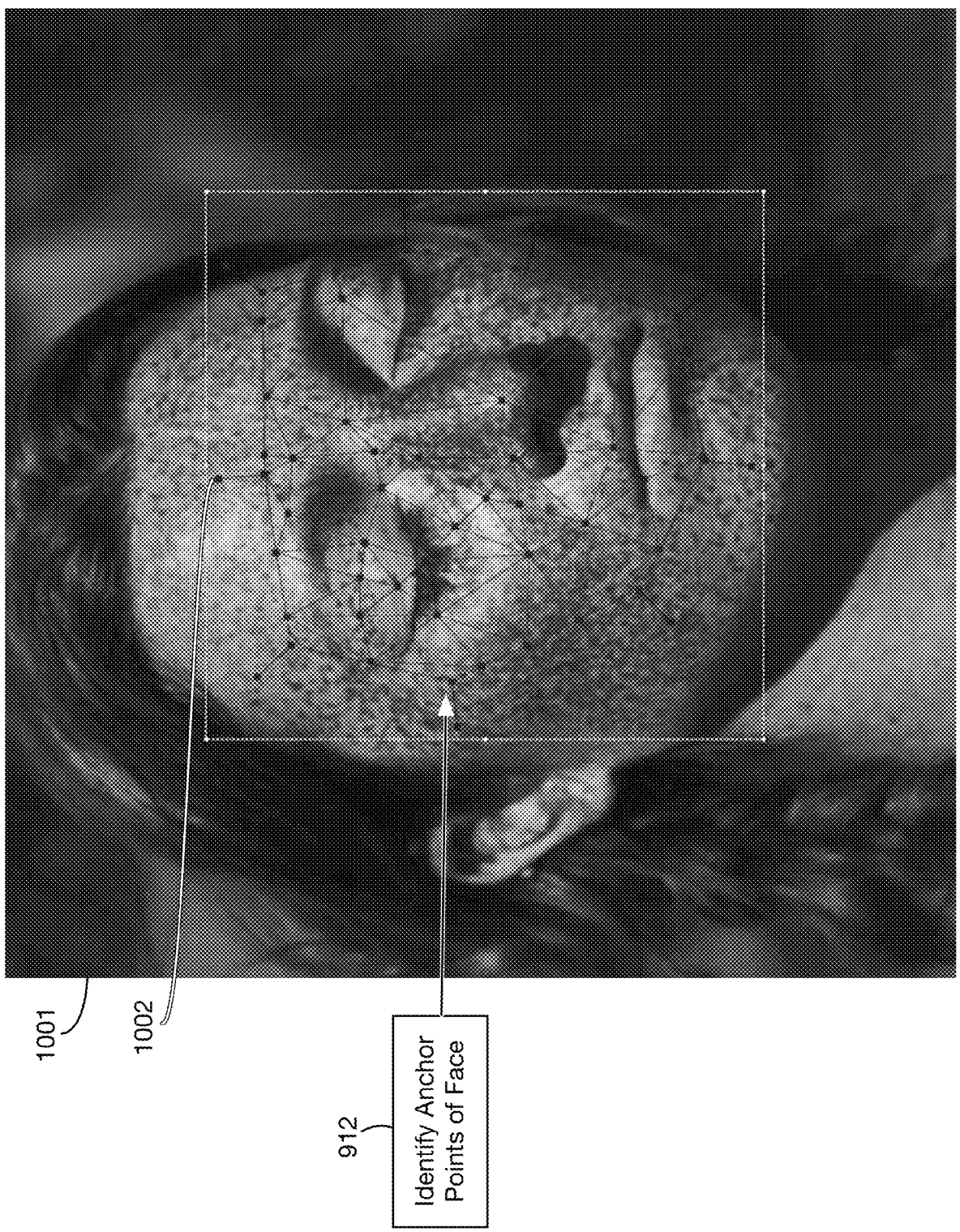
FIG. 10 illustrates locating facial anchor points in an ultraviolet image.
Figure 11:
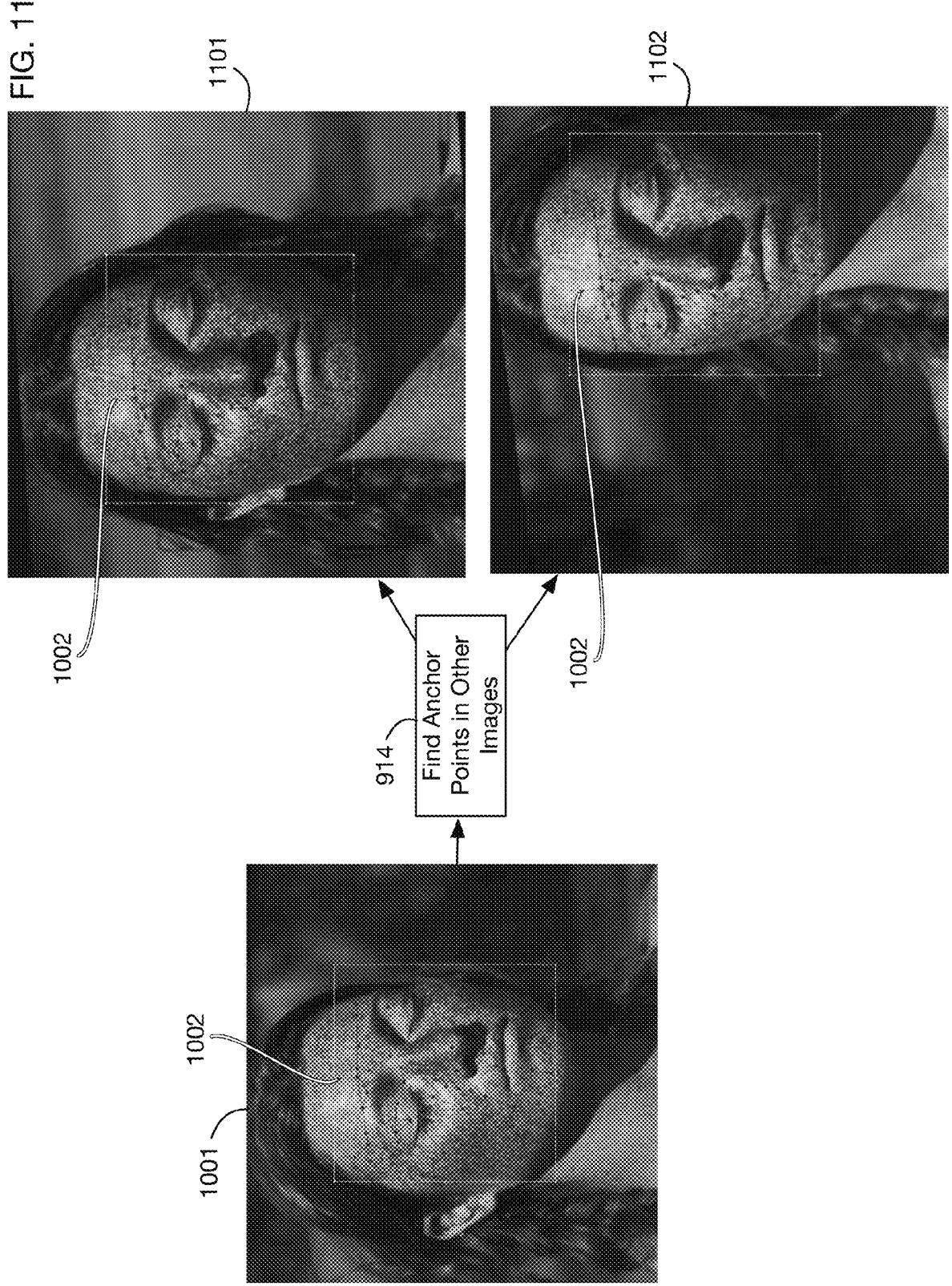
FIG. 11 illustrates tracking the face of FIG. 10 using the facial anchor points as the person moves into different positions or orientations.
Figure 12:
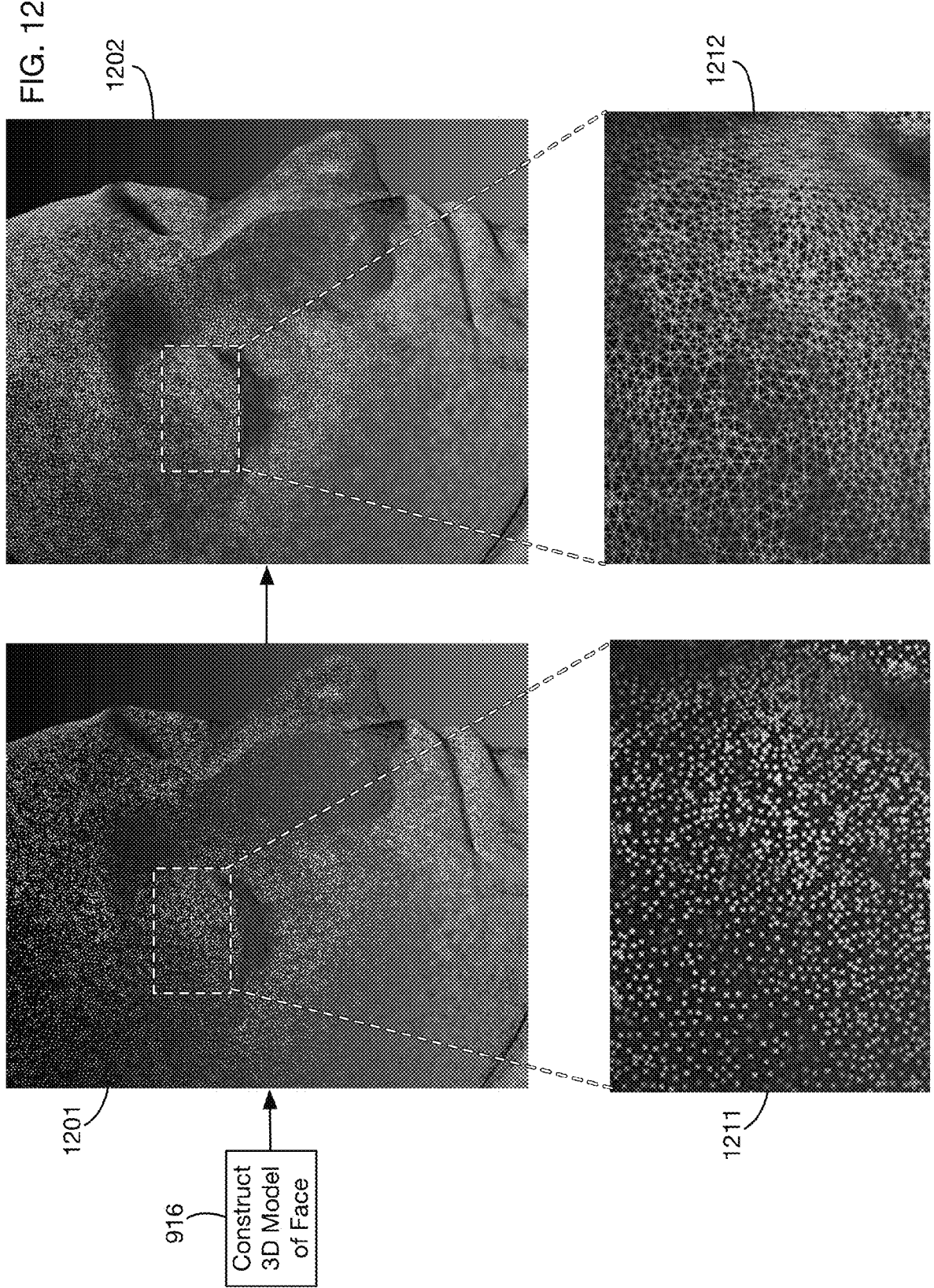
FIG. 12 illustrates steps in constructing a 3D model of a face from different ultraviolet images of the face, using point clouds and tessellation.
Figure 13:
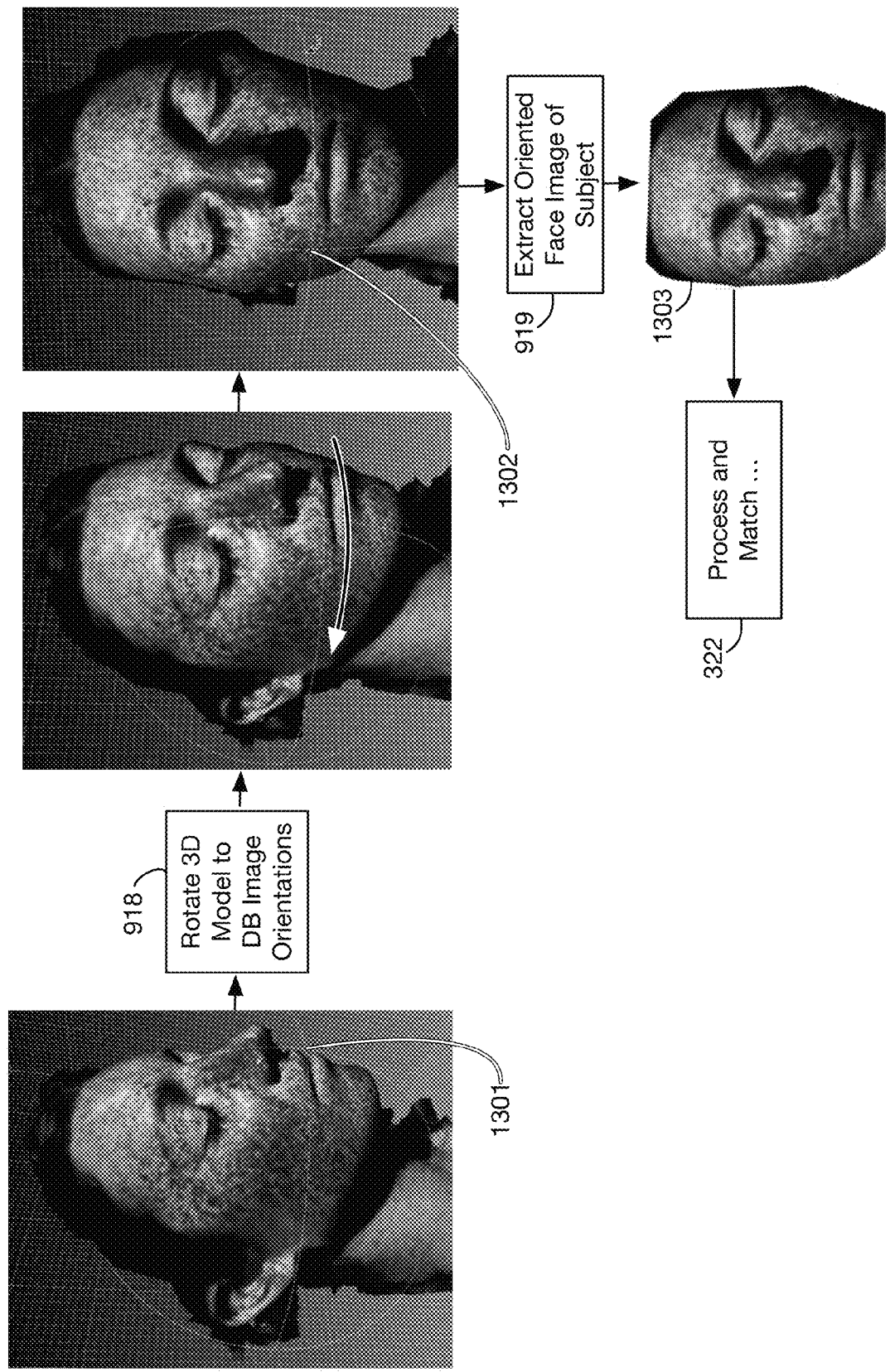
FIG. 13 illustrates rotating a 3D model of a face to an orientation that corresponds to images in the reference database of person images, to simplify image comparison and matching.

FIG. 10 illustrates step 912 of identifying face anchor points within ultraviolet image 1001. In this example, the SIFT algorithm is used to find (and describe) anchor points. The anchor points located are shown as blue dots in FIG. 10, such as anchor point 1002 near the center of the forehead. FIG. 11 illustrates step 914 of locating these anchor points in other images, such as images 1101 and 1102 where the subject is in different orientations and positions. The SIFT algorithm correctly locates the anchor points in these images, finding for example anchor point 1002 by matching SIFT descriptors generated from image 1001. FIG. 12 illustrates step 916 to construct a 3D model of the face from the sequence of face images. A point cloud 1201 is generated for the face (shown in a detailed section in image 1211), and this point cloud is tessellated into a surface 1202 (shown in detailed section 1212). The facial image(s) may then be texture mapped to the surface 1202 to complete the 3D face model. FIG. 13 shows the 3D model 1301 of the face in its initial orientation. Step 918 then rotates this model to orientation 1302, which matches the orientation of image or images in the database to which the face is to be compared. Step 919 then extracts subject face image 1303, which is processed in steps 322 as described previously.

In one or more embodiments, the techniques described above for facial recognition may be applied to recognition of any part of a person's body. The approach of using chromophores visible in ultraviolet light to improve recognition may be applied to any portion of a user's skin, including but not limited to the face. In particular, in one or more embodiments this approach may be applied to hand recognition. Hands are a convenient body part for recognition because they are usually uncovered, and because hands are naturally extended towards a device or entry barrier in many applications.

Figure 14:
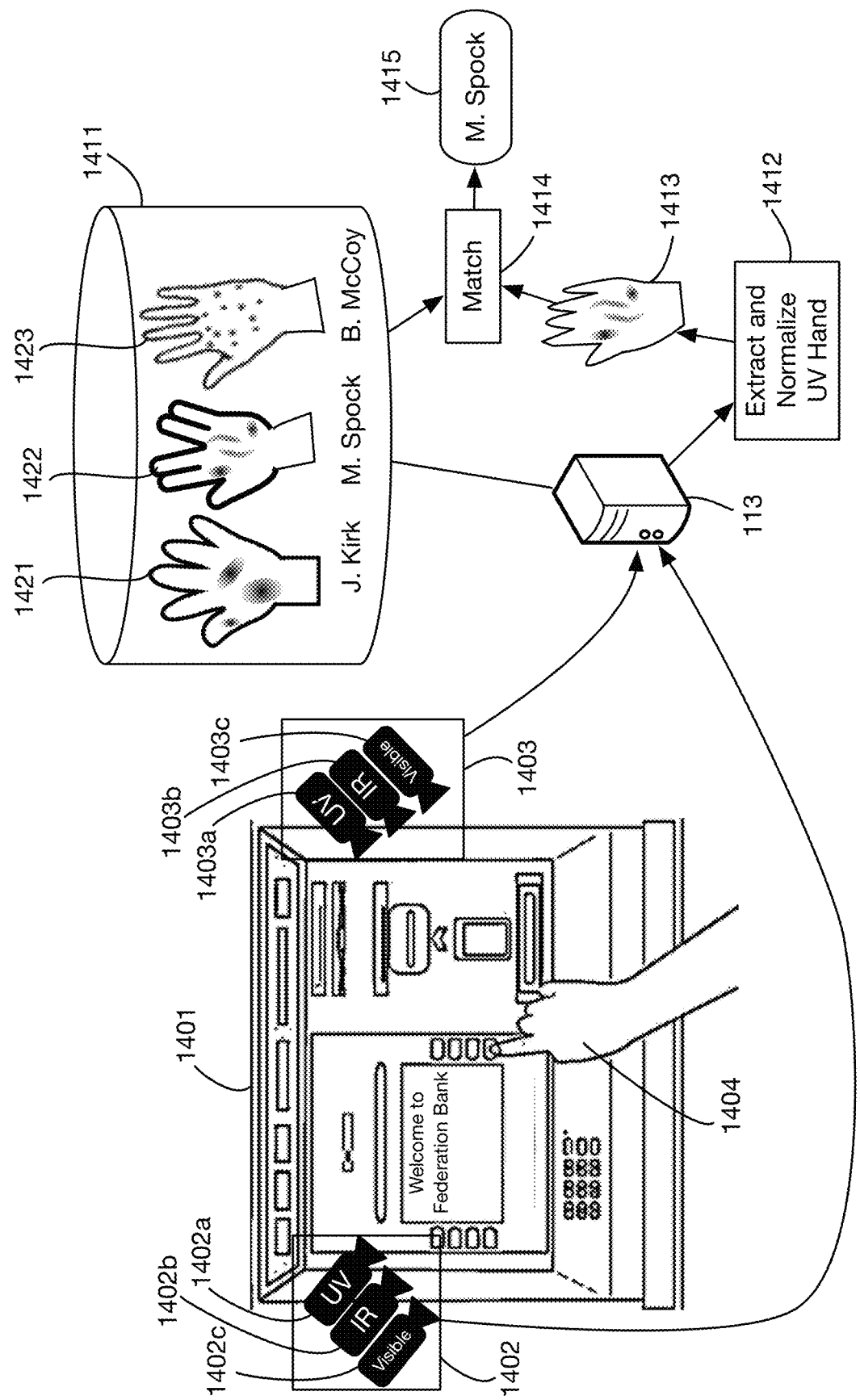
FIG. 14 shows an illustrative application of a hand recognition system to an Automated Teller Machine (ATM); images of a user's hand are captured in visible, infrared, and ultraviolet light, and ultraviolet image features of the hand are matched to a database to determine the user's identity.

FIG. 14 shows an illustrative embodiment that incorporates hand recognition into an ATM 1401. Cameras 1402 and 1403 are integrated into the ATM (or mounted in the vicinity of the ATM) and are oriented to capture an image of the back of the hand 1404 of an ATM user when the user extends the hand towards the ATM. Cameras 1402 may include for example ultraviolet light camera 1402*a*, infrared light camera 1402*b*, and visible light camera 1402*c*; similarly, cameras 1403 may include for example ultraviolet light camera 1403*a*, infrared light camera 1403*b*, and visible light camera 1403*c*. The ultraviolet cameras 1402*a* and 1403*a* may capture UV images of the back of hand 1404 for identification, and images from the other cameras may be used for example to locate and normalize the hand images, as described below.

The use of stereo cameras 1402 and 1403 is illustrative; one or more embodiments may use mono cameras or any number of cameras that capture images in any desired range or ranges of wavelengths.

Images from cameras 1402 and 1403 may be transmitted to processor or processors 113 for analysis. As with the facial recognition embodiments descried above, processor 113 may be coupled to a database 1411 that contains reference images of the backs of hands of registered or known users, including illustrative ultraviolet images 1421, 1422, and 1423. In a process that is analogous to the process described above for facial recognition, processor 113 first processes received images in step 1412 to extract a UV image of the subject's back of hand 1404, and to transform this UV image to a normalized image 1413 so that it is comparable to the images 1421, 1422, 1423 in database 1411. Processor 113 then performs a matching process 1414, which may for example use feature point comparisons and correlations as described above for facial image matching, to determine that the closest match is to user 1415.

One or more embodiments of the invention may apply the process shown in FIG. 14 to any body part or parts, including but not limited to any part of the hands, face, or head. One or more embodiments may use any number of cameras and any number of processors. Cameras and processors may be in any location or locations.

In one or more embodiments, images from infrared, ultraviolet, and visible cameras may be combined into a multi-channel image to facilitate downstream processing. Images from different cameras may be matched and aligned using pre-calibrated lens calibration and homography estimation at the time of manufacturing and placement of camera sensors into an enclosure. In one or more embodiments a hue channel may be extracted from the visible RGB (red, green, blue) imagery, since hue may be more useful for classification. A 6-channel image may be constructed with illustrative channels for red (visible), green (visible), blue (visible), hue (from RGB), infrared, and ultraviolet. Data may be stored for example as 16-bit integers with additional headers describing the resolution of the infrared and ultraviolet channels.

Figure 15:
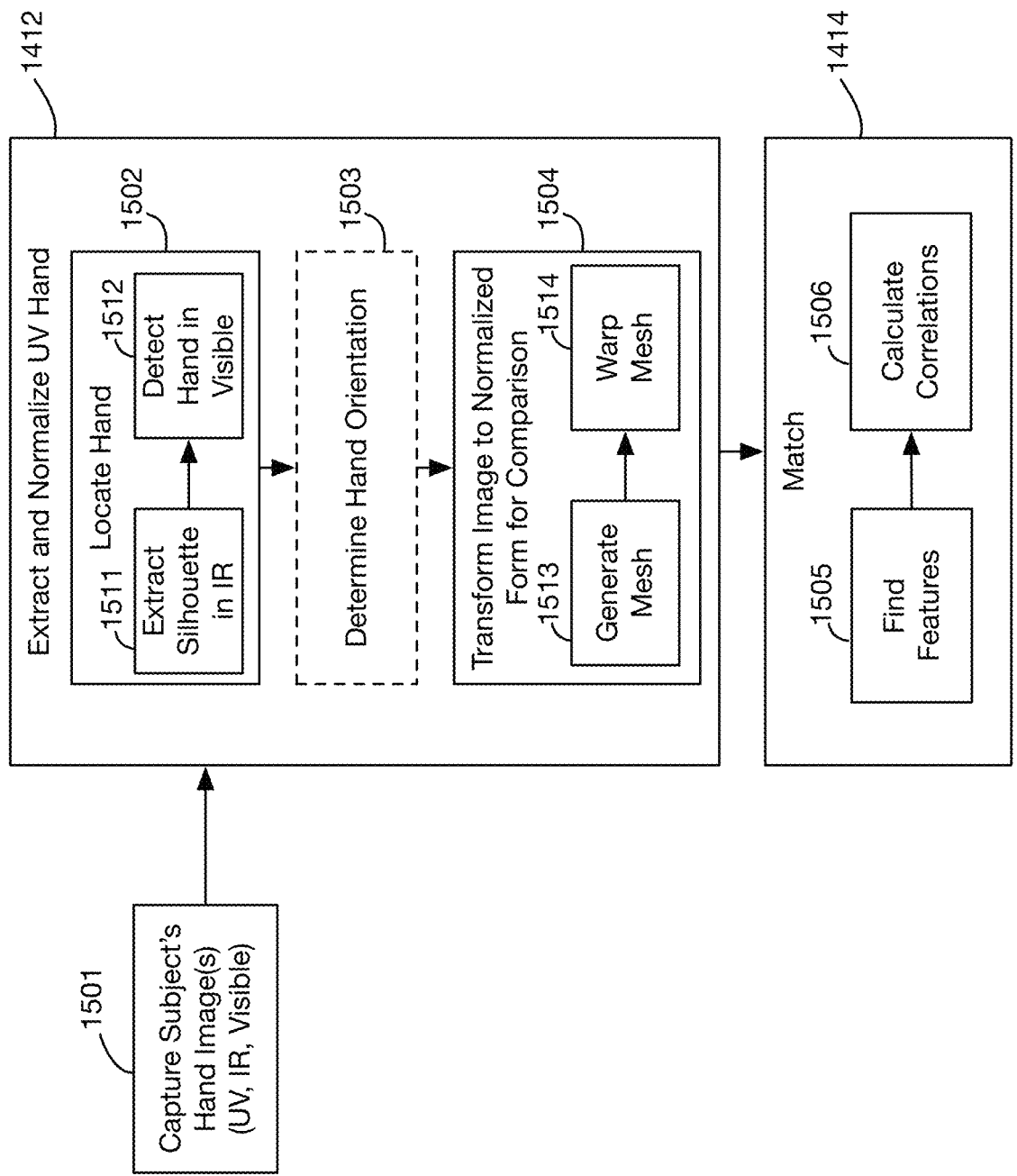
FIG. 15 shows illustrative processing steps for an embodiment of a hand recognition system that uses ultraviolet light images.

FIG. 15 shows a flowchart of illustrative steps that may be performed in one or more embodiments to implement a hand recognition system. The hand recognition system may recognize the front, back, or any part or parts of the hand. Some or all of the steps for hand recognition may be similar to or identical to the steps described above for face recognition. Similar steps may be performed to recognize any desired body part. In step 1501, one or more images of a subject's hand are captured by cameras, which may include for example one or more ultraviolet cameras, one or more infrared cameras, and one or more visible cameras. In one or more embodiments a single imaging element may capture images in multiple wavelengths, such as a combined visible-infrared camera. These images are then input into process 1412 that extracts and normalizes an ultraviolet image of the hand. Process 1412 may for example be performed in three phases in one or more embodiments: first, step 1502 may locate a hand in the captured images; second, step 1503 may determine the orientation of the hand; and third, step 1504 may transform the hand image to a normalized form that is suitable for comparison to the stored images in database 1411.

For hand localization step 1502, the inventors have discovered that use of the infrared channel to separate the hand from the background improves the robustness of the process. Therefore, in one or more embodiments a first step 1511 may extract the a mask of the silhouette of the hand (as well as potentially other areas with similar thermal characteristics) using the infrared channel. A subsequent step 1512 may detect and localize the hand using the visible light image(s), within the mask extracted in step 1511. This hand detection step 1512 may for example, without limitation, use a neural network or other machine learning system that is trained to detect hands in images; an illustrative embodiment may use a YOLO ("You Only Look Once") neural network to scan images for hands and to generate a bounding box containing a located hand.

In some applications, hand images may show either the back of a hand or the front (palm side) of a hand. In these applications it may be valuable to perform processing step 1503 to determine which side of the hand is predominately visible before normalizing the image. In other applications this step may be unnecessary; for example, in the ATM example illustrated in FIG. 14, a user may naturally present the back of the hand to cameras oriented near the top of the ATM. If hand orientation identification is needed or desired, one or more embodiments may use facial recognition in conjunction with hand recognition and may utilize constraints of human body mechanics to determine hand orientation. Since bone structure prevents the wrist from rotation towards the thumb, this restricts the set of possible hand positions relative to the face. General finger orientation may be determined for example using a Hough gradient and the thumb position. Fingers with a tilt towards the thumb will be showing the palm, while a tilt away from the thumb shows a back of the hand.

Step 1504 transforms the extracted ultraviolet hand image to a normalized form for comparison to the images in database 1411. An illustrative method for this transformation is to perform step 1513 to generate a mesh of the hand image, for example by tessellating the bounding mask of the hand silhouette, and then to perform a warp step 1514 to warp the mesh to match the normalized silhouette. Warp step 1514 may be for example a two-pass linear warp. In one or more embodiments of the invention, a three-dimensional model of the subject's hand may be constructed, using processing steps similar to those described above for facial recognition, and this model may be rotated to an orientation that is aligned with the hand images in the database. Generation and rotation of the three-dimensional model may use any or all of the ultraviolet, visible, and infrared images.

Tessellation may convert pixels into entities that are more efficient to manipulate in 3D. Since hand rotation affects anchor point location, it may be convenient to treat the image as a rotatable mesh, rather than as an array of pixels. A first pass segmentation may be performed using the infrared image of the hand, and the mask may then be refined using texture (hands are smooth and lack high frequency clutter). The mask may then be tessellated, which replaces pixels with vertices which store an XY and a UV. A temporary Z value may be assigned for each vertex, and upon matching masks, a set of rotated Z values may be determined based on the best fit using convergence (via the Levenberg-Marquardt method, for example). This process results in a reference transform for each vertex to get to a normalized position, as opposed to transforms for each pixel. Since the UV values (the 2D reference into the original image) are associated with each vertex, this provides an efficient mechanism to store the normalized transforms as well, since the floating-point pixel location at any point inside a triangle of the mesh can be calculated by linearly interpolating the intermediate UVs between the three vertices. Error can accumulate due to non-linear perspective warp, but can be inexpensively minimized by using smaller triangle sizes for the tessellation.

After normalization, matching process 1414 may for example including step 1505 to identify features in the normalized UV face image, and step 1506 to calculate correlations between the subject image features and the features of the reference images in the database. These steps may for example be identical to or similar to those described above for facial recognition, as illustrated for example in FIGS. 6, 7, and 8.

FIG. 16 illustrates some of the steps shown in FIG. 15 for images of a hand interacting with an ATM. Infrared image 1601*b* from infrared camera 1402*b* is input in mask extraction step 1511, to obtain mask 1602 for the regions of the image with thermal signatures that match the human body, particularly the areas of the hands. The mask extraction step 1511 may for example identify pixels with a thermal value within an expected range; in one or more embodiments additional processing may be performed on these pixels to form a mask, such as morphological operators, blob detection, or formation of convex hulls. Mask 1602 is then applied in step 1603 to the visible image channels 1601*c* captured by visible light camera 1402, resulting in visible masked image 1604. Step 1605 analyzes this visible masked image 1604 to confirm that it contains a hand image, and to identify a bounding box 1606 around the hand region; this step 1605 may for example use a neural network such as YOLO or a similar image detection or classification system. The portion 1601*a* of the subject ultraviolet image that corresponding to this bounding box 1606 is then transformed to a normal form in step 1504 (as described above with respect to FIG. 15) and matched against reference images in the database in step 1414 (using processes similar to those described above for facial image matching). While the invention herein disclosed has been described by means of specific embodiments and applications thereof, numerous modifications and variations could be made thereto by those skilled in the art without departing from the scope of the invention set forth in the claims.

What is claimed is:

1. A hand recognition system that compares narrow band ultraviolet-absorbing skin chromophores, comprising:
    an ultraviolet camera sensitive to wavelengths in an ultraviolet band;
    an infrared camera sensitive to wavelengths in an infrared band;
    a visible camera sensitive to wavelengths in a visible band;
    a database of person hand ultraviolet images captured in said ultraviolet band, wherein each person hand ultraviolet image of said person hand ultraviolet images is associated with a corresponding person of a plurality of persons; and
    one or more processors coupled to said ultraviolet camera, to said infrared camera, to said visible camera, and to said database, wherein said one or more processors are configured to identify person features in said each person hand ultraviolet image;
        calculate person feature descriptors of said person features of said each person hand ultraviolet image;
        obtain a subject ultraviolet image associated with a subject from said ultraviolet camera;
        obtain a subject infrared image associated with said subject from said infrared camera;
        obtain a subject visible image associated with said subject from said visible camera;

align said subject ultraviolet image, said subject infrared image, and said subject visible image;
obtain a mask comprising a hand of said subject based on said subject infrared image;
apply said mask to said subject visible image to obtain a visible masked image;
input said visible masked image into a hand recognizer to obtain a bounding box containing a visible image of said hand of said subject;
obtain a subject hand ultraviolet image as a region of said subject ultraviolet image within said bounding box;
identify subject features in said subject hand ultraviolet image;
calculate subject feature descriptors of said subject features;
compare said subject feature descriptors to said person feature descriptors of said each person hand ultraviolet image to calculate a correlation score associated with said each person hand ultraviolet image;
select a matching person hand ultraviolet image as a person hand ultraviolet image of said person hand ultraviolet images with a highest associated correlation score, when said highest associated correlation score is greater than a threshold value; and,
identify said subject with the corresponding person associated with said matching person hand ultraviolet image.

2. The hand recognition system of claim 1, wherein said hand recognizer comprises a neural network.

3. The hand recognition system of claim 1, wherein said hand recognizer comprises a neural network.

4. The hand recognition system of claim 3, wherein said neural network comprises a YOLO neural network.

5. The hand recognition system of claim 1, wherein said wavelengths in said ultraviolet band comprise 360-370 nanometers.

6. The hand recognition system of claim 1, wherein said ultraviolet band comprises a bandwidth of less than or equal to 25 nanometers.

7. The hand recognition system of claim 1, wherein said identify person features comprises locate said person features with a corner detector; and
said identify subject features comprises locate said subject features with said corner detector.

8. The hand recognition system of claim 7, wherein said corner detector is selected from a Moravec family of corner detectors, or a Harris-Stephens, or a Kanade-Lucas-Tomasi, or a Shi-Tomasi or a Förstner corner detector.

9. The hand recognition system of claim 1, wherein
said calculate person feature descriptors comprises calculate SURF descriptors of said person features; and
said calculate subject feature descriptors comprises calculate SURF descriptors of said subject features.

10. The hand recognition system of claim 1, wherein said calculate said correlation score comprises calculate matching feature pairs, each matching feature pair of said matching feature pairs comprising
a subject feature of said subject features; and
a corresponding person feature of said person features;
wherein a subject feature descriptor of said subject feature descriptors associated with said subject feature matches a person feature descriptor of said person feature descriptors associated with said corresponding person feature.

11. The hand recognition system of claim 10, wherein said correlation score comprises a count of said matching feature pairs.

12. The hand recognition system of claim 10, wherein said calculate said correlation score further comprises calculate matching feature lines comprising a line segment corresponding to said each matching feature pair, wherein said line segment is between said subject feature of said each matching feature pair and said corresponding person feature of said each matching feature pair; and, calculate said correlation score based on said matching feature lines.

13. The hand recognition system of claim 12, wherein said calculate said correlation score is based on at least a similarity of slopes of said matching feature lines.

14. The hand recognition system of claim 1, wherein said calculate said correlation score comprises a Fourier transform of the subject hand ultraviolet image and of the corresponding person hand ultraviolet image and a comparison of spectrograms of said subject hand ultraviolet image and said person hand ultraviolet image.

15. The hand recognition system of claim 1, wherein said one or more processors are further configured to enhance contrast of said person hand ultraviolet images and of said subject hand ultraviolet image.

16. The hand recognition system of claim 15, wherein said enhance contrast comprises apply a local S-curve transformation to said person hand ultraviolet images and said subject hand ultraviolet image.

17. The hand recognition system of claim 1, wherein said one or more processors are further configured to
transform said each person hand ultraviolet image to a standard size and aspect ratio; and
transform said subject hand ultraviolet image to said standard size and aspect ratio.

18. The hand recognition system of claim 1, wherein said one or more processors are further configured to
obtain a sequence of scene images from said ultraviolet camera, said infrared camera, and said visible camera over a time period;
construct a three-dimensional model of said hand of said subject from said sequence of scene images; and,
rotate said three-dimensional model of said hand of said subject to an orientation of said each person hand ultraviolet image to transform said subject hand ultraviolet image before said identify subject features in said subject hand ultraviolet image.

* * * * *